United States Patent
Kinstler

(10) Patent No.: US 7,120,713 B2
(45) Date of Patent: Oct. 10, 2006

(54) SYSTEMS AND METHODS FOR INTERFACING LEGACY EQUIPMENT TO HIGH-SPEED DATA BUSES

(75) Inventor: Gary A. Kinstler, Torrance, CA (US)

(73) Assignee: The Boeing Company, Chicago, IL (US)

(*) Notice: Subject to any disclaimer, the term of this patent is extended or adjusted under 35 U.S.C. 154(b) by 358 days.

(21) Appl. No.: 10/411,937

(22) Filed: Apr. 11, 2003

(65) Prior Publication Data

US 2004/0205284 A1    Oct. 14, 2004

(51) Int. Cl.
  *G06F 13/362* (2006.01)
  *H04J 3/16* (2006.01)
  *H04J 3/02* (2006.01)

(52) U.S. Cl. .................. 710/117; 370/467; 370/538

(58) Field of Classification Search ............ 370/467, 370/538; 710/117
See application file for complete search history.

(56) References Cited

U.S. PATENT DOCUMENTS

| | | | | |
|---|---|---|---|---|
| 5,367,641 A | * | 11/1994 | Pressprich et al. | 710/305 |
| 5,938,752 A | * | 8/1999 | Leung et al. | 710/106 |
| 6,266,729 B1 | * | 7/2001 | Leung et al. | 710/313 |
| 6,283,416 B1 | * | 9/2001 | Fleeter et al. | 244/176 |
| 6,360,290 B1 | * | 3/2002 | Avritch et al. | 710/105 |
| 6,831,926 B1 | * | 12/2004 | Kinstler | 370/467 |
| 2004/0015630 A1 | * | 1/2004 | Boolos et al. | 710/300 |

* cited by examiner

*Primary Examiner*—Rehana Perveen
*Assistant Examiner*—Christopher A. Daley
(74) *Attorney, Agent, or Firm*—Ingrassia Fisher & Lorenz, P.C.

(57) ABSTRACT

Various methods and systems provide interfaces between legacy data buses such as MIL-STD 1553 buses and wideband data buses such as IEEE 1394 data buses. One technique for interfacing a legacy device to a wideband data bus includes the broad steps of receiving legacy data in a legacy format from the legacy device, acquiring a timeslot on the high-speed data bus for at least a portion of the legacy data, embedding the portion of the legacy data into the timeslot to thereby transmit the portion of the data on the wideband data bus, repeating the acquiring and embedding steps until all of the received data is transmitted on the wideband data bus. The timeslot may be, for example, an immediate timeslot obtained via an interrupt-type request, or an acknowledge-accelerated arbitration requested timeslot occurring during a recurring access window.

26 Claims, 6 Drawing Sheets

SYSTEMS AND METHODS FOR INTERFACING LEGACY EQUIPMENT TO HIGH-SPEED DATA BUSES

TECHNICAL FIELD OF THE INVENTION

The present invention generally relates to data communications technologies, and more particularly relates to systems and techniques for interfacing legacy equipment to high-speed data communications buses and networks.

BACKGROUND OF THE INVENTION

Modern computing and control systems such as those found in aircraft and spacecraft typically include multiple sensing and/or processing components that are interconnected by a data network. Systems used in a typical avionics environment include flight management systems, air data computers, engine and air sensors, flight control systems, cockpit instrumentation and the like.

As the various computing systems used in these environments become increasingly capable, wideband data communications technologies have evolved to support faster data transfer rates between components and systems in many aerospace, industrial, transportation and other settings. The IEEE 1394b standard, for example, describes a bus implementation that supports data transfer speeds of 800 Mbps or higher over a serial connection. Other wideband data connection technologies providing high-speed data transfer include fiber data definition interface (FDDI), asynchronous transfer mode (ATM), Fiber Channel, Fast Ethernet and the like.

Even as new data communications technologies become increasingly prevalent, however, legacy systems based upon older technologies continue in widespread use. Many of these systems remain in operation due to their high reliability, and due to the relatively long periods of time often required to design, build and obtain government certification for newer systems. Systems and components designed to communicate using the MIL-STD 1553 standard, for example, have been widely deployed in aviation, space and other environments for many years. MIL-STD 1553 networks typically include a bus controller (BC) that controls traffic on a redundant bus that interconnects various remote terminal (R/T) client nodes. MIL-STD 1553 generally specifies that data is transferred between nodes in packets of not more than thirty-two data words (with each word including sixteen data bits and four control bits) across redundant twisted-pair wires with a data rate on the order of 1 MHz. The MIL-STD 1553B standard (which was a revision of earlier MIL-STD 1553 standards) was released as a tri-service/NATO standard in 1978, and is widely available.

It is generally desirable for the legacy and non-legacy components within an aircraft, spacecraft or other environment to share data and otherwise interoperate with each other. In particular, it is generally desirable to interface legacy components with newer bus technologies to take advantage of the increased bandwidth available, and to eliminate the need to provide legacy wiring throughout the vehicle or other environment. Often, however, difficulties arise in interfacing older "legacy" systems to newer technologies. MIL-STD 1553 components, for example, are highly reliable, yet generally incompatible with newer wideband technologies without significant modification. Although several products are available to interface legacy components to newer data networks, problems often remain in implementation of these products. As an example of a design difficulty to be overcome, MIL-STD 1553 typically specifies that each transmitting component receive a "handshake" response from the receiving component within fourteen microseconds of the original data transmission. While this requirement is relatively easy to meet on a conventional MIL-STD 1553 bus, it is often difficult to meet in practice when legacy components communicate across other types of data connections. In particular, the fourteen microsecond handshake period limits the ability to locate bus controllers and remote terminals on separate bus segments, thereby limiting design flexibility. Accordingly, difficulties remain in achieving true integration between the various computing systems and components operating within an avionics or other environment. Moreover, the cost, weight and complexity of providing separate legacy and wideband networks can present significant issues in highly demanding environments.

It is therefore desirable to allow legacy systems such as those based upon MIL-STD 1553 to communicate across newer high-speed data buses such as those based upon IEEE 1394 and other standards. Further, it is desirable to use high-speed data buses to interconnect legacy bus controllers and remote terminals without requiring additional cabling or excessive modifications to the legacy components. It is therefore highly desirable to create systems and methods for interfacing legacy equipment to high-speed data buses. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Various methods and systems provide interfaces between legacy data buses such as MIL-STD 1553 buses and wideband data buses such as IEEE 1394 data buses. One technique for interfacing a legacy device to a wideband data bus includes the broad steps of receiving legacy data in a legacy format from the legacy device, acquiring a timeslot on the high-speed data bus for at least a portion of the legacy data, embedding the portion of the legacy data into the timeslot to thereby transmit the portion of the data on the wideband data bus, repeating the acquiring and embedding steps until all of the received data is transmitted on the wideband data bus. The timeslot may be, for example, an immediate timeslot obtained via an interrupt-type request, or an acknowledge-accelerated arbitrated accessed timeslot occurring during a recurring access window.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1A:
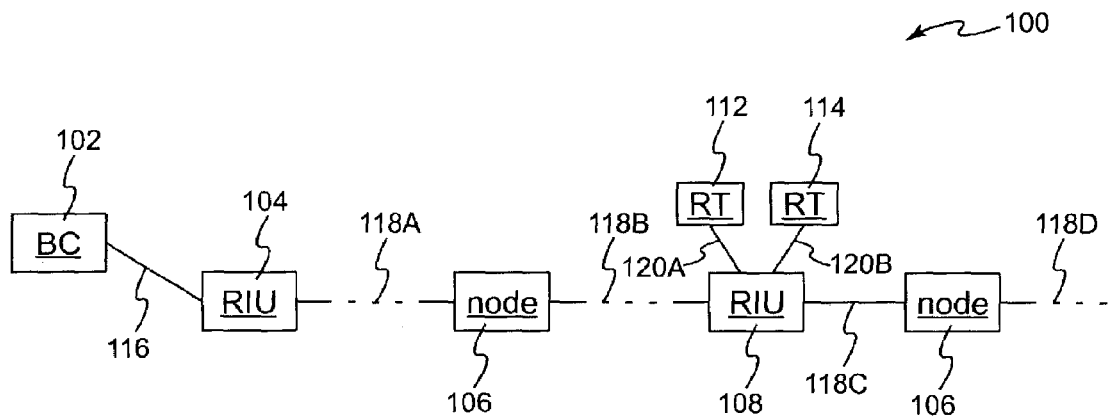
FIG. 1A is a block diagram of an exemplary system facilitating legacy data transmission on a high-speed data bus.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various embodiments, legacy systems such as those based upon MIL-STD 1553 technologies are appropriately interfaced to high-speed, wideband data networks and/or buses using one or more remote interface units (RIUs) or other legacy interfaces. Each interface is suitably configured to receive data from one or more legacy components and to place data received from the legacy equipment into one or more timeslots obtained on the wideband bus. The legacy data may be divided into relatively small data packets to facilitate transmission in relatively narrow timeslots on the wideband bus, and to thereby reduce latency during transmission. In various embodiments, the timeslots are obtained using requests for immediate and/or acknowledge-accelerated arbitration access that may be provided, for example, in a PHY/LINK layer implementation of the wideband protocol. In various further embodiments, a handshake time limit imposed by the legacy protocol may be adjusted, lengthened or otherwise relaxed to prevent undesired timeouts during data transmissions. In a further alternative embodiment, the functions of a legacy bus controller may be incorporated into a remote interface unit that bridges a legacy bus to the wideband network. In such embodiments the interface appropriately provides handshake responses and/or status responses to the legacy components as appropriate to avoid timeout errors.

By implementing the systems and techniques described herein, legacy nodes are suitably allowed to share data and/or to otherwise interoperate with wideband nodes without requiring significant modification. Moreover, the number of legacy buses (and associated cabling) required in many data sharing environments may be reduced by providing legacy traffic across wideband networks rather than the comparatively limited legacy buses.

As used herein, the terms "component" and "device" are intended to broadly encompass any computers, computing devices, sensors, input/output devices, modules and/or processes that are capable of processing or gathering data, and that are capable of communicating in any data communications environment. Unless context dictates otherwise, the term "bus" as used herein is intended to broadly encompass any serial or parallel bus architecture or topology, as well as any other network or other inter-connection between computing devices. "High speed" buses as described herein may include any wideband digital, optical, wireless or other networking or bus technology or protocol. Similarly, the term "legacy" systems is intended to encompass MIL-STD 1553, as well as any other technologies, systems, components and/or protocols that may be adapted for use on high-speed buses as described herein.

With reference now to FIG. 1A, an exemplary system 100 for interfacing legacy systems to a wideband data bus suitably includes one or more remote interface units (RIUs) 104, 108 allowing a legacy bus controller 102 to communicate with one or more remote terminals (R/Ts) 112, 114 across a wideband bus 118. RIUs 104, 108 are any systems, processing cards, or other computing devices capable of interfacing legacy components to wideband buses, and are described in additional detail below. Bus controller (BC) 102 is any conventional card, application or device that is responsible for directing the flow of data on one or more legacy bus segments 120 as appropriate. In the case of MIL-STD 1553 bus controllers, each bus segment 116, 120 may have one or more bus controllers, although only one may be active at any time. R/Ts 112, 114 are any devices and/or processes capable of communicating over legacy bus segments 120A and 120B, respectively, and may include data sensors (e.g. a radio altimeter), navigation aids, or the like. Although two legacy bus segments 112, 114 are shown in system 100, any number of legacy buses and/or segments may be provided in a wide array of equivalent embodiments.

Wideband bus 118 is any bus or other network interconnection capable of transmitting data between RIUs 104 and 108. In an exemplary embodiment, wideband bus 118 includes several data bus segments 118A–D operating in compliance with the IEEE 1394b specification, although other wideband bus or network technologies such as other versions of IEEE 1394, Fiber Channel or Fast Ethernet could be used in equivalent embodiments. FIG. 1 also shows several nodes 106 operating on wideband bus 118 in a native mode. To continue the example using IEEE 1394b buses, the various nodes 106 and RIUs 104, 108 are suitably interconnected by various bus segments 118A–D in a serial fashion, although other network topologies (e.g. tree, ring, hub and the like) could be used in alternate embodiments.

In operation, bus controller 102 suitably communicates with remote terminals 112, 114 and manages traffic on legacy bus segments 120A–B via remote interface units 104, 108. Data originating from BC 102 is provided in legacy format from BC 102 to RIU 104 via legacy bus segment 116, which may operate using the same standards and/or protocols as bus segments 120A–B. RIU 104 suitably receives data across bus segment 116 and contacts RIU 108 via wideband bus 118 to transfer the data as appropriate. In various exemplary embodiments, RIU 104 transfers legacy data by dividing the data into several smaller portions and requesting immediate and/or acknowledge-accelerated arbitration access to wideband bus 118. Several techniques for transmitting legacy data across wideband bus 118 are described in detail below. RIU 108 suitably receives the data portions from RIU 104, re-assembles the data in legacy format, and provides the data to the destination R/T 112, 114 via legacy bus segments 120A–B. Return data is sent via an opposite path, with the sending R/T 112, 114 providing data to RIU 108 via legacy bus segments 120A–B, which obtains timeslots on wideband bus 118 to transfer the data to RIU 104. RIU 104, in turn, re-assembles the data and provides the resulting data in legacy format to BC 102 via legacy bus segment 116. In a further embodiment, timeout limits (e.g. time budgets allocated for responses by R/Ts 112, 114) on the various legacy components are adjusted to compensate for the additional delays incurred during transit, as described more fully below. Alternatively, RIUs 104, 108 may provide status words to transmitting legacy components to notify them that return data is in transit, thereby preventing timeout errors from occurring.

Figure 1B:
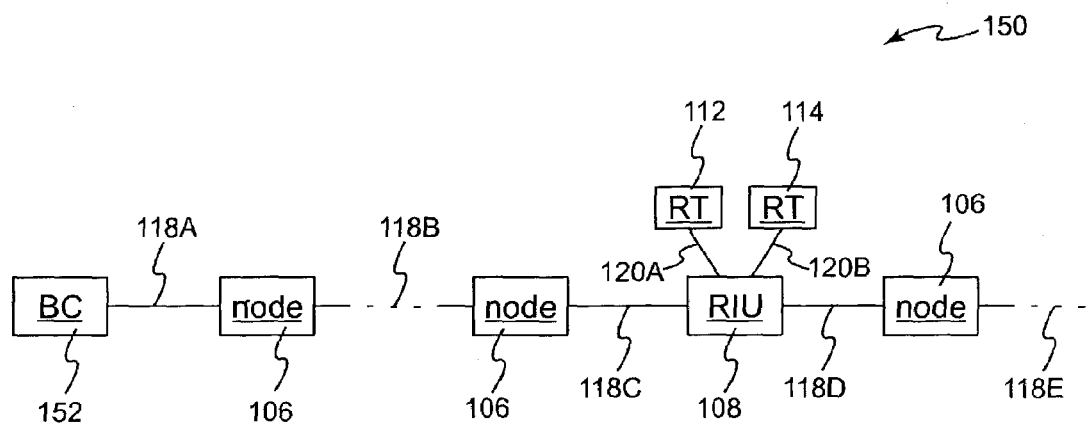
FIG. 1B is a block diagram of an alternate exemplary system facilitating legacy data transmission on a high-speed data bus.

The exemplary system 100 shown in FIG. 1A may be modified in many ways. Any number of native wideband nodes 106 (within the inherent node limits of the native wideband bus employed) may be present in equivalent embodiments, for example, as may any number of legacy nodes 112, 114 operating on any number of legacy bus segments 120A–B. Indeed, multiple RIUs 108 may be provided on wideband bus 118, with each RIU 108 coupling any number of legacy bus segments 120 to wideband bus 118. In such embodiments, a single bus controller 102 could be used to manage traffic on each of the various legacy buses, thereby reducing duplication in function and improving cost efficiency in some embodiments. Further, one or more of the RIUs 104, 108 could be eliminated in alternate embodiments. FIG. 1B, for example, shows an alternate system 150 for controlling legacy data bus segments 120A–B across wideband bus 118 that includes a bus controller node 152 that is able to natively communicate on wideband bus 118 without an additional RIU 104. Further embodiments that combine the functionalities of BC 102 and RIU 108 are described below, for example in conjunction with FIG. 6.

Figure 2:
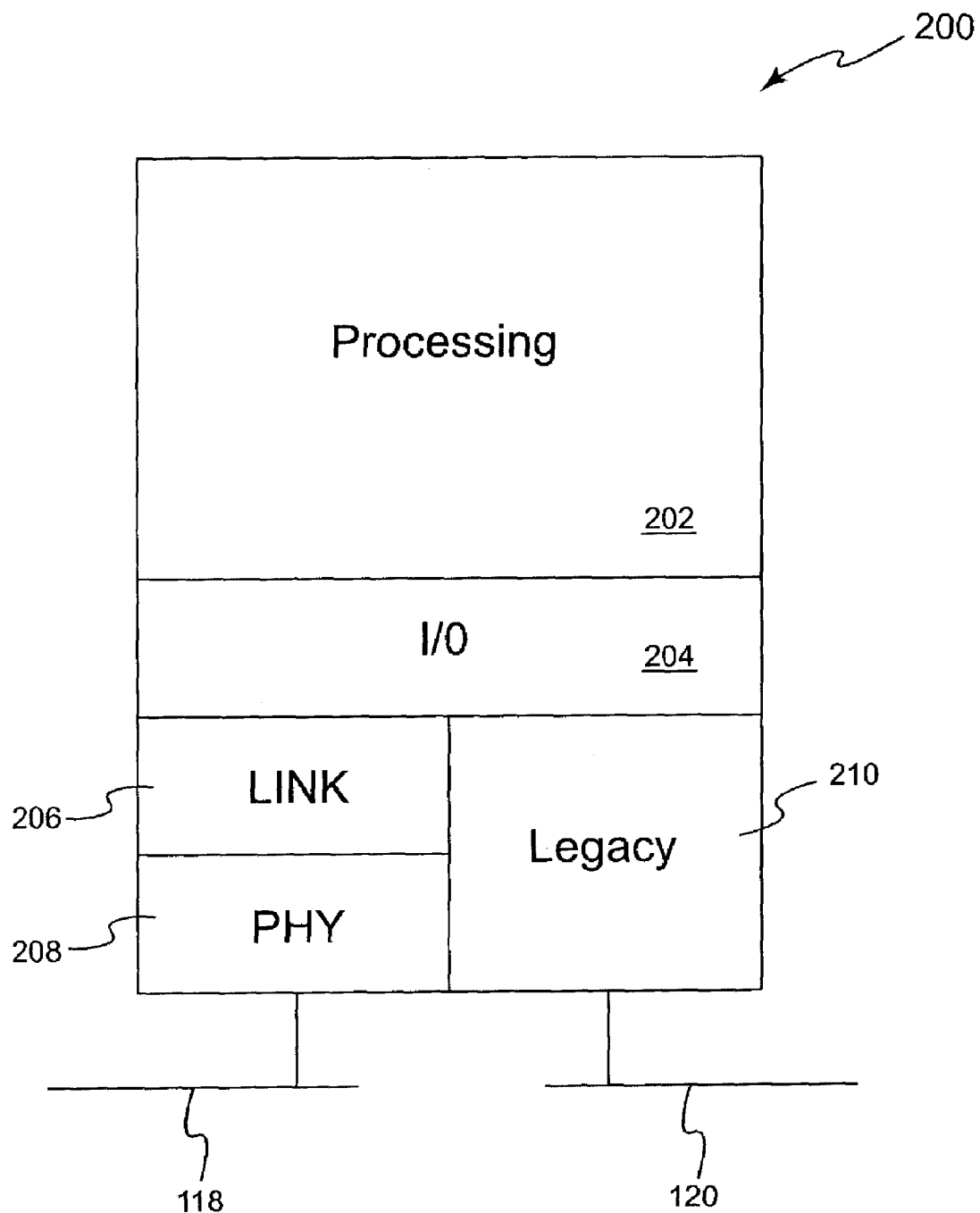
FIG. 2 is a block diagram of an exemplary legacy interface.

As used herein, a "legacy interface" broadly refers to any device or component that provides an interface between a legacy bus and a wideband bus. Examples of legacy interfaces 200 include RIUs 104/108 (FIGS. 1A–1B), bus controller 152 (FIG. 1B), and the like. With reference now to FIG. 2, an exemplary legacy interface 200 suitably includes a legacy input/output (I/O) module 210, wideband PHY and LINK layer implementations 208, 206 (respectively), an I/O subsystem 204, and a data processing module 202.

In an exemplary embodiment, legacy I/O module 210 is implemented with a conventional MIL-STD 1553 card and PHY module 208 and LINK module 206 are implemented using conventional IEEE 1394b chips, cards or other implementations. Other protocols and implementations, however, could be used in alternate embodiments. I/O subsystem 204 may be implemented using conventional hardware or software components (e.g. operating system components) that are capable of granting access to I/O resources on legacy interface 200. Processing module 202 is any application, applet, program, routine, object or the like executing on any processor and written in any programming language. In one embodiment, the instructions for processing module 202 are stored in digital memory, and may also be stored on a hard drive, flash memory, EEPROM or other digital storage medium. The various components of legacy interface 200 shown in FIG. 2 are intended as logical models, and may be implemented in practice with any type of hardware and/or software. Further, the various functions of the modules described may be organized in different fashions in the various alternate embodiments, with a wide range of equivalent interfaces 200 having additional, fewer, different, or differently combined modules.

In operation, legacy interface 200 suitably acts as a bridge or other interface between legacy network 120 and wideband network 118 in response to control instructions from processing module 202. Accordingly, processing module 202 suitably includes instruction routines and/or modules to receive data from the legacy and wideband buses, and to re-transmit the data on the other network as appropriate, and as described more fully below. In various embodiments, processing module 202 is able to receive legacy data from legacy bus 120, to obtain one or more timeslots on wideband bus 118, and to divide the legacy data into portions that are able to be transmitted within the available timeslots. Processing module conversely is able to receive data from wideband bus 118 and to place the data into a format that can be translated and received via legacy bus 120.

Figure 3A:
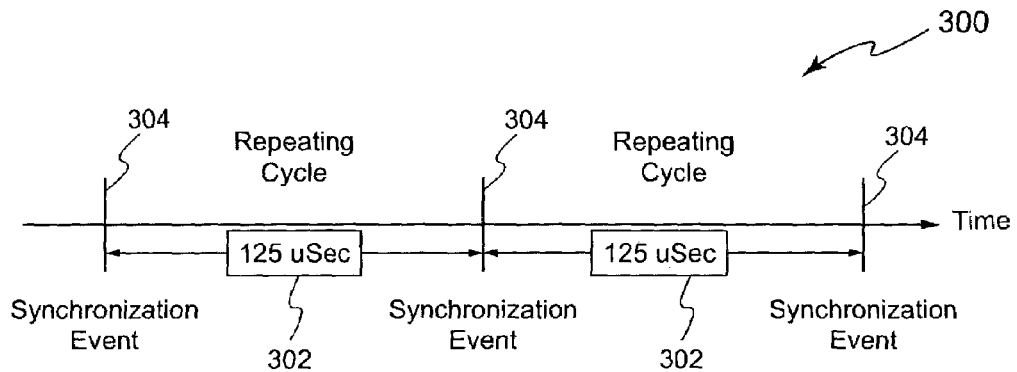
FIG. 3A is a timing diagram showing repeating timing cycles on a high-speed data bus.
Figure 3B:
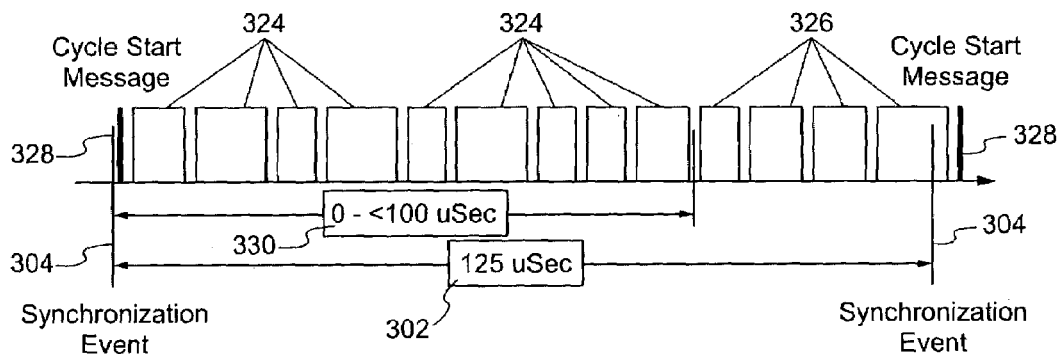
FIG. 3B is a timing diagram showing an exemplary messaging sequence on a high-speed data network.

With reference now to FIG. 3A, an exemplary timing scheme 300 as may be used on wideband data bus 118 (FIGS. 1–2) suitably includes repeating isochronous cycles 302 separated by synchronization events 304. In the case of IEEE 1394 buses, each cycle 302 is defined to have a period of nominally 125 microseconds, although other periods could be used with other protocols in alternate embodiments. The timing for the cycles is maintained by one of the nodes 106 on wideband bus 118. FIG. 3B shows additional timing detail about an exemplary IEEE 1394 embodiment, with various isochronous messages 324 and asynchronous messages 326 variously placed on the bus within the 125 μsec period between synchronization events 304. Each synchronization event 304 is announced to each node 106 on wideband bus 118 by a high-priority cycle start message 328 that is placed on the bus at the first opportunity following the synchronization event. In general, a portion 330 of up to the first eighty-percent of each cycle 302 following the cycle start message 328 is reserved for isochronous traffic 324, which is conventionally used to transfer multi-media content such as audio or video data, although other types of data may also be transferred isochronously. The remainder of the cycle (as well as any remaining unused time from isochronous portion 330) is generally available for asynchronous messages 326. Additional detail about IEEE 1394 buses and the timing of data transmissions on such buses can be found, for example, in the IEEE 1394b specification entitled "High-Performance Serial Bus" dated April, 2002, available from the Institute of Electrical and Electronic Engineers Standards Association (IEEE-SA).

Figure 4A:
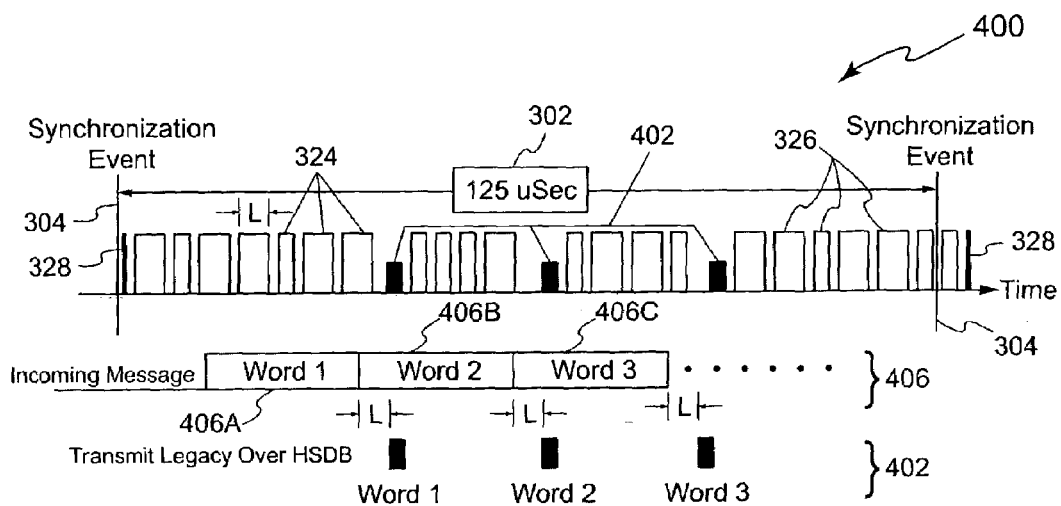
FIG. 4A is a timing diagram showing an exemplary scheme for obtaining a timeslot on a high-speed data bus for legacy data.
Figure 4B:
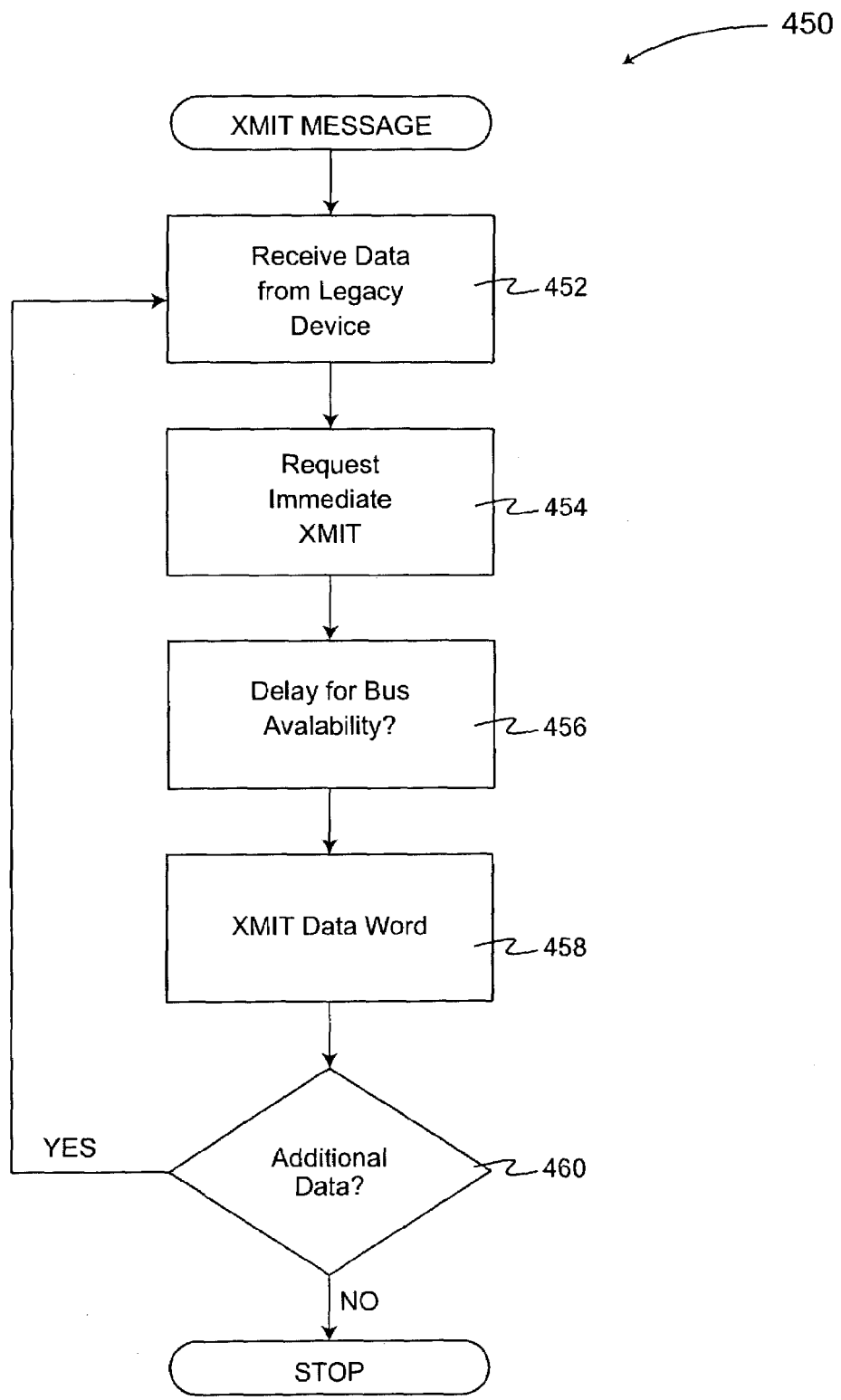
FIG. 4B is a flowchart of an exemplary process for transmitting legacy data on a high-speed data bus.

An exemplary technique for obtaining priority access to wideband bus 118 is described in FIGS. 4A–B. Referring now to FIG. 4A, an exemplary timing scheme 400 suitable for use in transmitting legacy data within a wideband bus framework suitably includes legacy data 402 occupying priority timeslots within one or more repeating cycles 302. Priority timeslots are obtained, for example, using the Immediate Packet Transmit Request (IPTR) arbitration function available in certain IEEE 1394b implementations, or using any other interrupt-type service available in any protocol. The IPTR service may be provided, for example, using software executing at any legacy interface to access a physical or link layer service incorporated in an application specific integrated circuit (ASIC) or conventional hardware implementation of the IEEE 1394b protocol. Such hardware is available, for example, from Texas Instruments of Plano, Tex., including part numbers TSB81BA3 3-port Cable Transceiver/Arbiter for an exemplary PHY implementation 208, and TSB82AA2 1394b OHCI Controller for an exemplary LINK implementation 206.

When a legacy interface 200 obtains data via a legacy data bus 116 or 120 from a legacy component (e.g. BC 102 or R/Ts 108 in FIG. 1), the RIU suitably requests immediate access to wideband bus 118 using the IPTR service. Access may be requested as soon as the first legacy data word is received at the legacy interface 200, or may be requested at a later period of time in alternate embodiments. By placing an IPTR request, legacy interface 200 is provided with very high priority access to the data bus, and effectively gains access to the bus as soon as the current message on the bus is complete. In a conventional IEEE 1394 embodiment, only cycle start messages 328 have higher priority than IPTR traffic, meaning that legacy data may be placed on wideband bus 118 even during the isochronous portion of the cycle.

After the request for immediate access is placed, legacy interface 200 suitably waits a period of time to ensure that wideband bus 118 is clear of traffic from other nodes 106 that may be coupled to the bus. During this waiting period, the legacy interface 200 suitably prevents other nodes on wideband bus 118 from transmitting additional data by providing a data prefix signal on the bus to indicate that a transmission is about to start. The period of delay ("L") may be any period of time, but in many embodiments the period L is based upon the maximum length of messages allowed on wideband database 118, and may vary between embodiments based on various design constraints. If the maximum message length is determined to be on the order of ten microseconds, for example, the period of delay L may correspond to the ten microsecond delay to ensure that the bus is clear prior to transmission. During this delay period, however, it is possible that no traffic will be passed on the bus, thereby decreasing the overall bandwidth available from the wideband bus. Accordingly, other embodiments may opt to configure the maximum message lengths on the wideband bus and/or delay times L to be shorter (e.g. on the order of about five microseconds or so), although of course other delay times from about zero to about twenty microseconds or more could be used in alternate embodiments. After legacy interface 200 has obtained priority access and the pre-determined delay period has elapsed, the legacy data words are transmitted on the wideband bus during the available timeslot.

Legacy data is appropriately transferred in piecemeal fashion across the wideband bus to reduce intra-message gaps. In the exemplary embodiment shown, legacy interface 200 transmits data in single-word increments at approximately regular intervals, although alternate embodiments may make use of multi-word transmissions. In the scenario shown, access to the wideband bus is suitably guaranteed within time period L of the interrupt request, plus an internal latency on the order of about twenty microseconds due to queuing times, thereby creating a transport initiation delay of about 20+L μsec for one-way messages, or 40+2L μsec for bi-directional communications. Accordingly, a maximum message length L of five microseconds may result in a bi-directional trip latency of about fifty microseconds, and a maximum message length L of ten microseconds may result in bi-directional trip latency on the order of about sixty microseconds. At conventional databus operating rates, a value of L=10 microseconds may provide a maximum message size of about eight kilobits (or about one Kbyte), which should be adequate for many embodiments. As mentioned above, however, the value of L may be optimized or otherwise adjusted to provide any desired balance of maximum message size, bus utilization, and response latency times. Nevertheless, it may be advantageous to adjust the maximum timeout budget in the bus controller software driver to reflect additional delay times that may be incurred. In MIL-STD 1553 embodiments, for example, the maximum timeout budget for round-trip communications is typically set to fourteen microseconds. Continuing the example above, if the maximum message length L is selected to be ten microseconds, a new adjusted value of seventy-four or more microseconds may be appropriate. Alternatively, one or more RIUs could be configured to transmit "message following" messages to the BC at regular intervals to thereby prevent timeout errors from occurring, as briefly mentioned above. After the data transfer is complete, the RIU suitably relinquishes wideband bus 118, and bus traffic continues as appropriate.

An exemplary process 450 of transmitting legacy data on the wideband bus as described above is summarized in flowchart form in FIG. 4B. As a legacy data word is received on the legacy bus (step 452), legacy interface 200 (FIG. 2) appropriately requests immediate access to the wideband bus (step 454) and then holds the bus for a pre-configured period of time to ensure bus availability (step 456). When the bus is available, the received data word is transmitted on the wideband bus (step 458), and the bus is temporarily relinquished until additional data is received (step 460), and the process may repeat until all data is transferred as appropriate. Process 450 may be implemented and/or controlled by software instructions residing on any digital storage medium such as a static or dynamic random access memory (RAM), floppy disk, compact disk, read-only memory (ROM), or any other digital, optical, and/or electromagnetic storage medium. In an exemplary embodiment, process 450 is executed by a software application or module 202 residing within any legacy interface 200, or by any other computing device.

Figure 5A:
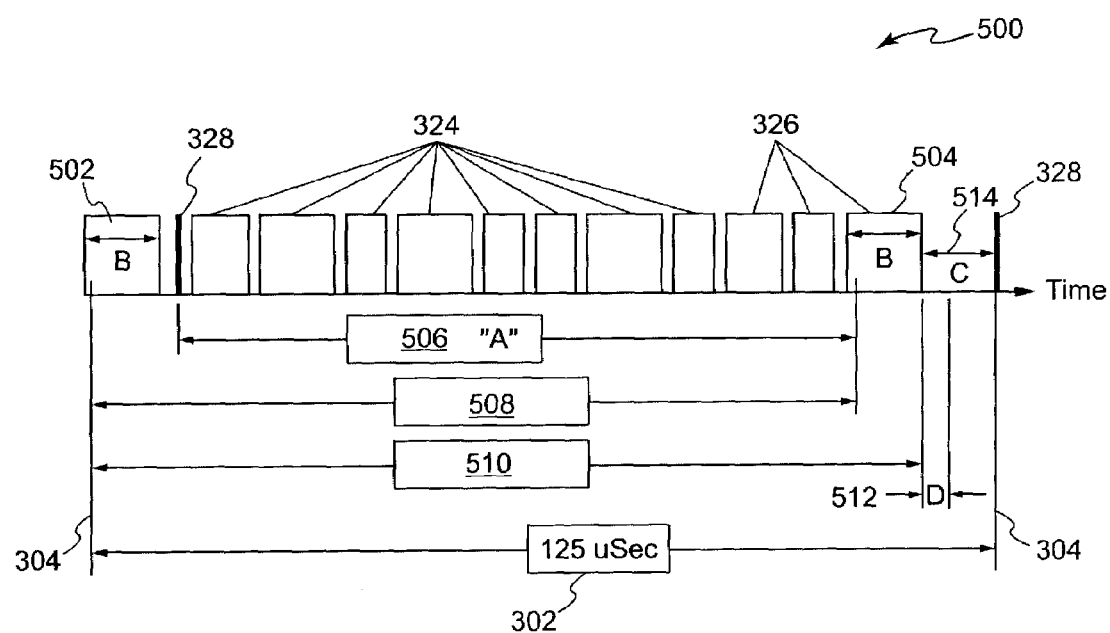
FIG. 5A is a timing diagram showing an exemplary scheme for obtaining a timeslot on a high-speed data bus for legacy data.
Figure 5B:
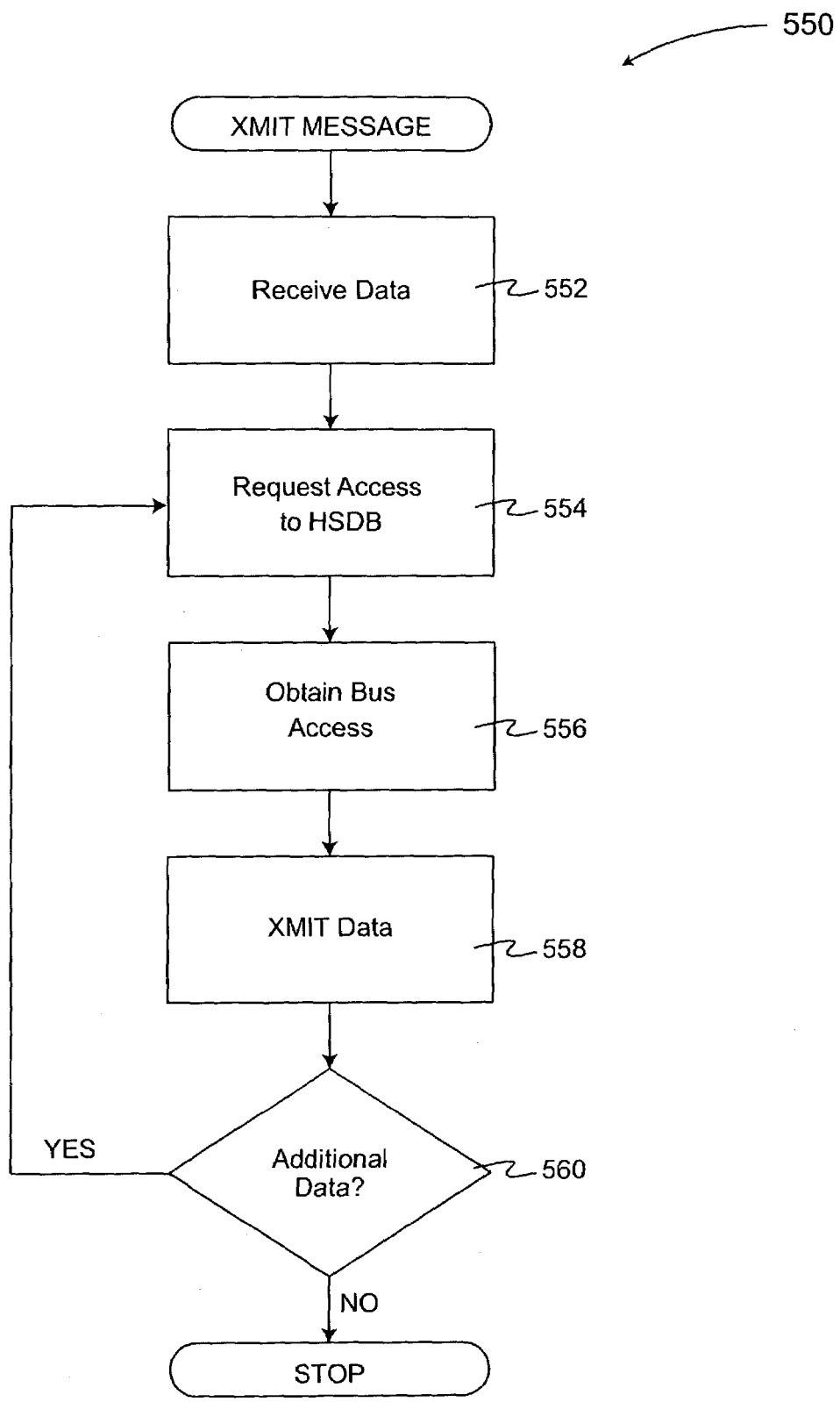
FIG. 5B is a flowchart of an exemplary process for transmitting legacy data on a high-speed data bus.

Another exemplary technique for transmitting legacy data within timeslots on the wideband bus is described in FIGS. 5A–B. As described therein, legacy interface 200 appropriately obtains acknowledge-accelerated arbitration access to the wideband bus by using, for example, the acknowledge-accelerated arbitration features available from implementations of IEEE 1394a or 1394b. Although the arbitration-accelerated arbitration access may not be as rapid as the immediate access techniques outlined above, acknowledge-accelerated arbitration access may be desirable in some situations, particularly when immediate access is not available from the PHY or LINK layer implementations used in the legacy interface 200.

With reference now to FIG. 5A, an exemplary timing scheme 500 that provides acknowledge-accelerated arbitration access to wideband bus 118 may be designed to guarantee at least a small portion of each cycle for legacy data. In particular, the maximum length of the isochronous portion of the cycle and the maximum message length allowed on the bus may be designed to accommodate at least a relatively short period of each cycle where legacy data may be transmitted on the wideband bus. As shown by FIG. 5A, the period 506 which corresponds to the guaranteed portion of the cycle for isochronous messages 324 may be enforced to the one hundred microsecond period conventionally used with IEEE 1394b protocols, or may be otherwise adjusted as appropriate. This period 506 is also referred to herein as "period A". In the most time-consuming scenario, isochronous period 506 may become sandwiched by asynchronous messages 326 of maximum length ("period B"). This condition could occur if a maximum length asynchronous message 502 is placed on wideband bus 118 just prior to a synchronization event 304, resulting in a delay in issuing cycle start message 328, and an ensuing delay in the beginning of isochronous period 506. If isochronous messages 324 fail to consume the entire isochronous period 506, asynchronous messages 326 may be allowed on bus 118 prior to the end of period 506. If an asynchronous message 504 of maximum length (again, period "B") is placed on the bus just prior to the end of isochronous period 506, the bus is effectively consumed for a maximum period of A+2B before asynchronous data can be placed on wideband bus 116. If isochronous period 506 ("A") is enforced to 100 μsec, for example, and the maximum message size ("B") is designed to be five microseconds, a guaranteed access window 514 of at least fifteen microseconds of uncommitted time remains in each cycle 302. Similarly, if the maximum message size ("B") is designed to be 10 μsec, an access window 514 of at least five microseconds remains uncommitted in each cycle 302. Some or all of window 514 may be allocated to legacy data 402, as appropriate. The portion of window 514 allocated to legacy data 402 is shown in FIG. 5A as timeslot "D" 512. Accordingly, if an acknowledge-accelerated arbitration request is placed on wideband bus 118 by any legacy interface 200, it can be assured that at least some portion 512 of each cycle is available for transmitting legacy data during a guaranteed access window 514. In various embodiments, however, access window 514 is available to non-legacy data when not reserved by a legacy interface 200.

With reference now to FIG. 5B, an exemplary process 550 for providing acknowledge-accelerated arbitration access to a wideband data bus for legacy data suitably includes the broad steps of receiving the legacy data (step 552), issuing a request for acknowledge-accelerated arbitration access (step 554), obtaining access to the bus (step 556), and transmitting the data during available timeslots on the wideband bus (steps 558, 560). As with process 450 described above, process 550 may be implemented in any manner, such as with a digital computer executing programming instructions stored on any digital storage medium. In an exemplary embodiment, process 550 is executed by any legacy interface 200, and computer-executable instructions 202 for implementing process 550 may be stored in memory and/or mass storage affiliated or accessible to legacy interface 200 or any other component as appropriate.

As legacy data is received at a legacy interface 200 (step 552), interface 200 suitably places an acknowledge-accelerated arbitration access request on wideband bus 118 (step 554). The request may be placed in any appropriate format, and in an exemplary embodiment the request conforms to the Acknowledge-Accelerated arbitration provided in IEEE 1394a and 1394b link level implementations. In a further embodiment, Acknowledge-Accelerated arbitration functionality is enabled only in legacy interfaces 200 on wideband bus 118 to prevent non-legacy nodes 106 from requesting priority access during access window 514.

Access to wideband bus 118 may be provided as described above (step 556), and data may be placed on the bus in any manner (steps 558, 560). As with the immediate access technique described above, legacy data may be transmitted on wideband bus 118 in piecemeal form, as appropriate. That is, legacy data may be transmitted in multiple or single word packets, for example, or in other smaller portions to accommodate access window 514. Alternatively, entire multiword legacy messages may be transmitted as single messages on wideband bus 118 if sufficient time is available for such transmission. In using access method 550 for legacy messages longer than repeating period 302, it should be noted that all data received from the legacy equipment between access windows 514 should be transmitted onto bus 118 with each access. For MIL STD 1553 legacy interfaces, such would typically entail gathering six or seven 20-bit words (e.g. on the order of 120–140 bits) between each access to bus 118. As an exemplary implementation, if an effective throughput of, for example, 800 Mbps is implemented, each such multiple word message, when packaged with message addressing and error checking overhead bits totaling 256 bits combined, would consume approximately 0.48 μsec to transmit on bus 118. If a five microsecond access window 514 is available, at least ten of such messages could be transmitted to as many as ten different legacy interfaces 200 at 100% legacy bus loading on bus 118. Alternatively, multiple data words may be transmitted to one or more individual legacy interfaces 200 on bus 118 during a particular access window 514, as appropriate. In many embodiments, however, it may be desirable to space legacy data across multiple cycles 302 to create predictable time windows and to reduce intra-message gap interruptions. As with the immediate transmission technique described above, it may be advantageous to adjust the maximum timeout budget in bus controller software driver to reflect additional delay times that may be incurred during message transit. The timeout budget may be set to a value on the order of 50–100 microseconds, for example, to accommodate the additional delays. Alternatively, "message following" messages could be provided to the bus controller at regular intervals, as mentioned above.

Accordingly, legacy bus controllers are allowed to communicate with remote terminals on legacy bus segments that are separated from the bus controller by a wideband network by providing a mechanism for the legacy interface to request timeslots for legacy data on the wideband network. Legacy data may be transmitted in piecemeal format (e.g. single words or small groups of words in a single message), and maximum response delay times in the bus controller can be appropriately adjusted to compensate for the additional transit times.

While several exemplary embodiments have been presented in the foregoing detailed description, it should be appreciated that a vast number of equivalent variations exist. Although the systems and techniques described herein are frequently described as interfacing MIL-STD 1553 devices to an IEEE 1394b network, for example, the invention is not so limited. Indeed, any legacy and/or wideband technologies such as Fiber Channel or the like could be used in various alternate but equivalent embodiments. It should also be appreciated that the exemplary embodiments are only examples, and are not intended to limit the scope, applicability, or configuration of the invention in any way. Rather, the foregoing detailed description will provide those skilled in the art with a convenient road map for implementing exemplary embodiments. It should be understood that various changes can be made in the function and arrangement of elements and/or steps without departing from the scope of the invention as set forth in the appended claims and the legal equivalents thereof.

What is claimed is:

1. A method of interfacing a legacy device to a wideband data bus, the method comprising the steps of:
   receiving legacy data in a legacy format from the legacy device;
   acquiring a timeslot on the high-speed data bus for at least a portion of the legacy data;
   embedding the portion of the legacy data into the timeslot to thereby transmit the portion of the data on the wideband data bus; and
   repeating the acquiring and embedding steps until all of the received data is transmitted on the wideband data bus.

2. The method of claim 1 wherein the legacy device is a MIL-STD 1553 device.

3. The method of claim 2 wherein the wideband data bus is a IEEE-1394 bus.

4. The method of claim 3 wherein the wideband data bus is a IEEE-1394 b bus.

5. The method of claim 4 wherein the acquiring step comprises issuing an immediate packet transmit request to gain access to the wideband data bus.

6. The method of claim 5 wherein the embedding step further comprises withholding data transmission until a pre-determined period of time has elapsed.

7. The method of claim 5 wherein the portion of legacy data comprises a single data word.

8. The method of claim 4 wherein the acquiring step comprises issuing an acknowledge-accelerated arbitration request to obtain access to a recurring access window on the wideband data bus.

9. The method of claim 8 wherein the access window is a portion of a repeating time cycle.

10. The method of claim 1 further comprising the step of adjusting a maximum timeout budget for the legacy format.

11. A digital storage medium having computer-executable instructions stored thereon, wherein the instructions are configured to execute the method of claim 1.

12. A method of transmitting MIL-STD 1553 data over an IEEE 1394 data bus, the method comprising the step of:
receiving the MIL-STD 1553 data from a legacy device at a remote interface unit; initiating an immediate packet transmit request from the remote interface unit to obtain a timeslot on the IEEE 1394 data bus;
delaying transmission from the remote interface unit on the IEEE 1394 data bus for at least a pre-determined period of time, wherein the pre-determined period of time is based upon the maximum message length allowed on the IEEE 1394 data bus;
transmitting at least a one-word portion of the MIL-STD 1553 data from the remote interface unit on the IEEE 1394 data bus after the pie-determined period of time has elapsed; and
repeating the initiating, delaying and transmitting steps until all of the MIL-STD 1553 data is transmitted on the IEEE 1394 data bus.

13. The method of claim 12 further comprising the step of adjusting a maximum timeout budget for the MIL-STD 1553 data.

14. A digital storage medium having computer-executable instructions stored thereon, wherein the instructions are configured to execute the method of claim 12.

15. The method of claim 12 wherein the pre-determined time is not more than 10 microseconds.

16. The method of claim 12 wherein the pre-determined time is not more than 5 microseconds.

17. A method of transmitting MIL-STD 1553 data over an IEEE 1394 data bus, the method comprising the steps of:
receiving the MIL-STD 1553 data from a legacy device at a remote interface unit;
initiating an acknowledge-accelerated arbitration request from the remote interface unit on the IEEE 1394 data bus to establish a priority window on the IEEE 1394 data bus;
transmitting at least a portion of the MIL-STD 1553 data on the IEEE 1394 data bus during the priority window; and
repeating the initiating and transmitting steps until all of the MIL-STD 1553 data is transmitted on the IEEE 1394 data bus.

18. The method of claim 17 further comprising the step of adjusting a maximum timeout budget for the MIL-STD 1553 data.

19. The method of claim 17 further comprising the step of setting a maximum message length on the IEEE 1394 data bus.

20. The method of claim 19 wherein the maximum message length does not exceed five microseconds.

21. The method of claim 19 wherein the maximum message length does not exceed ten microseconds.

22. A digital storage medium having computer-executable instructions stored thereon, wherein the instructions are configured to execute the method of claim 17.

23. A system for interfacing a legacy device with a high-speed data bus, the system comprising:
means for receiving data in a legacy format from the legacy device;
means for acquiring a timeslot on the wideband data bus for at least a portion of the data;
means for embedding the portion of the data into the timeslot to thereby transmit the portion of the data on the wideband data bus; and
means for repeating the acquiring and embedding steps until all of the received data is transmitted on the high speed data bus.

24. A system for interfacing a legacy device with a wideband data bus, the system comprising:
a first code module configured to receive data in a legacy format from the legacy device;
a second code module configured to acquire a timeslot on the wideband data bus for at least a portion of the data;
a third code module configured to embed the portion of the data into the timeslot to thereby transmit the portion of the data on the wideband data bus; and
a fourth code module configured to repeat the acquiring and embedding steps until all of the received data is transmitted on the high speed data bus.

25. A data processing system providing an interface between a legacy bus and a wideband bus, the system comprising:
a legacy input/output module in communication with the legacy bus;
a PHY layer module in communication wit the wideband bus;
a LINK layer module in communication with the PHY layer module; and
a processing module configured to communicate with the legacy I/O module and the LINK layer module via an input/output subsystem, wherein the processing module is operable to receive legacy data from the legacy bus via the legacy I/O module, to request a timeslot on the wideband bus for at least a portion of the legacy data via the LINK module, and to transmit the legacy data on the wideband bus using the timeslot.

26. A digital storage medium having computer-executable instructions stored thereon, the instructions comprising a processing module configured to communicate with a legacy I/O module and a LINK layer module via an input/output subsystem, wherein the processing module is operable to receive legacy data from a legacy bus via the legacy I/O module, to request a timeslot on a wideband bus for at least a portion of the legacy data via the LINK module, and to transmit the legacy data on the wideband bus using the timeslot to thereby form a bridge between the legacy bus and the wideband bus.

* * * * *